United States Patent [19]

Hollaway, Jr.

[11] Patent Number: 4,487,814

[45] Date of Patent: Dec. 11, 1984

[54] POLYMERIC STRIP FOR A POWER TRANSMISSION BELT, BELT MADE USING SUCH STRIP

[75] Inventor: Gerald C. Hollaway, Jr., Springfield, Mo.

[73] Assignee: Dayco Corporation, Dayton, Ohio

[21] Appl. No.: 557,026

[22] Filed: Dec. 1, 1983

Related U.S. Application Data

[62] Division of Ser. No. 263,963, May 15, 1981, Pat. No. 4,434,019.

[51] Int. Cl.³ .................................................. B32B 3/00
[52] U.S. Cl. ...................................... 428/57; 198/847; 428/192; 428/294; 428/295; 428/297; 428/298; 428/302; 428/303; 474/260
[58] Field of Search ................. 428/294, 295, 57, 297, 428/298, 302, 303, 192; 198/847; 152/359; 474/260, 262, 263, 264, 265, 268

[56] References Cited

U.S. PATENT DOCUMENTS 3,464,875  9/1969  Brooks et al. .................. 156/138
4,363,346 12/1982  Pepe ............................ 152/359

Primary Examiner—James J. Bell
Attorney, Agent, or Firm—Joseph V. Tassone

[57] ABSTRACT

A strip of material adapted for use in a power transmission belt construction, method of making such strip, and belt construction and method of making same employing the strip are provided wherein such strip comprises an uncured polymeric matrix material having opposed surfaces and a plurality of elongate reinforcing fibers disposed substantially uniformly throughout the matrix material in a random manner and in parallel relation and a plurality of parallel spaced apart bleeder yarns are adhered against at least one of the surfaces with the strip being adapted to be laminated against associated layer means comprising the belt construction on at least one common interface with the bleeder yarns along the interface and the bleeder yarns are adapted to serve as fluid passages for any fluid present at the interface during curing of the strip and its associated layer means.

16 Claims, 14 Drawing Figures

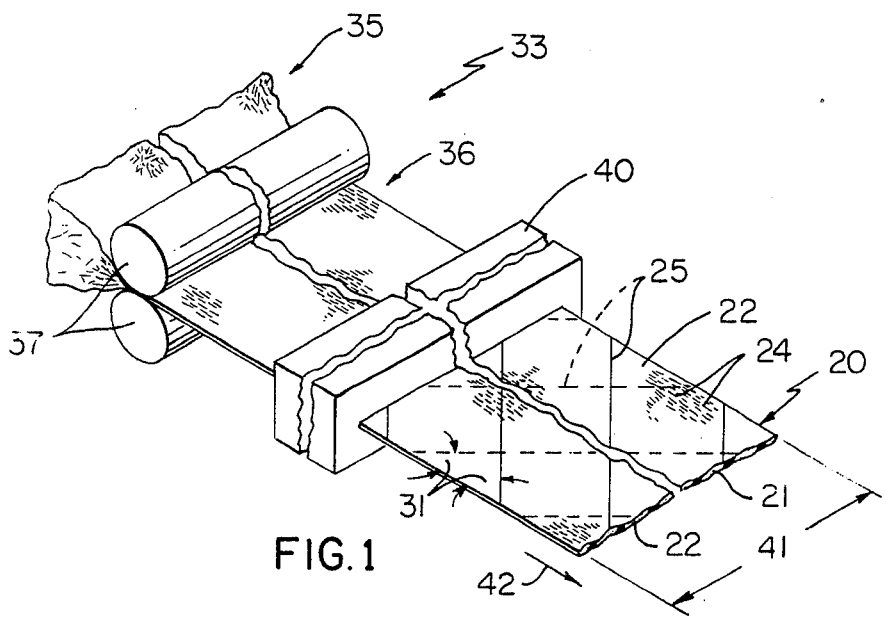
FIG. 1
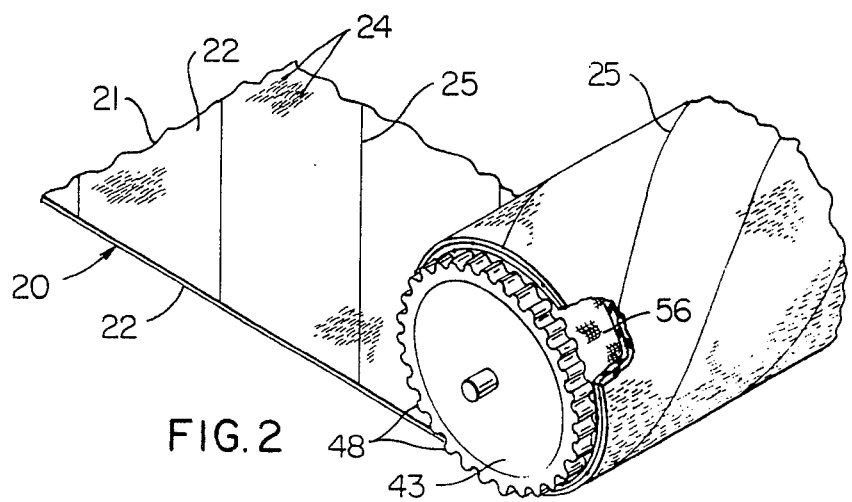
FIG. 2
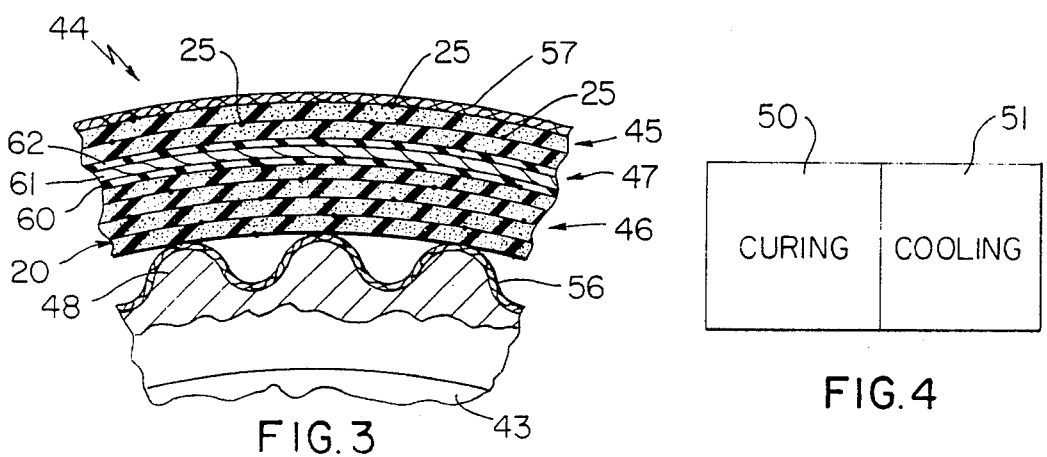
FIG. 3
FIG. 4

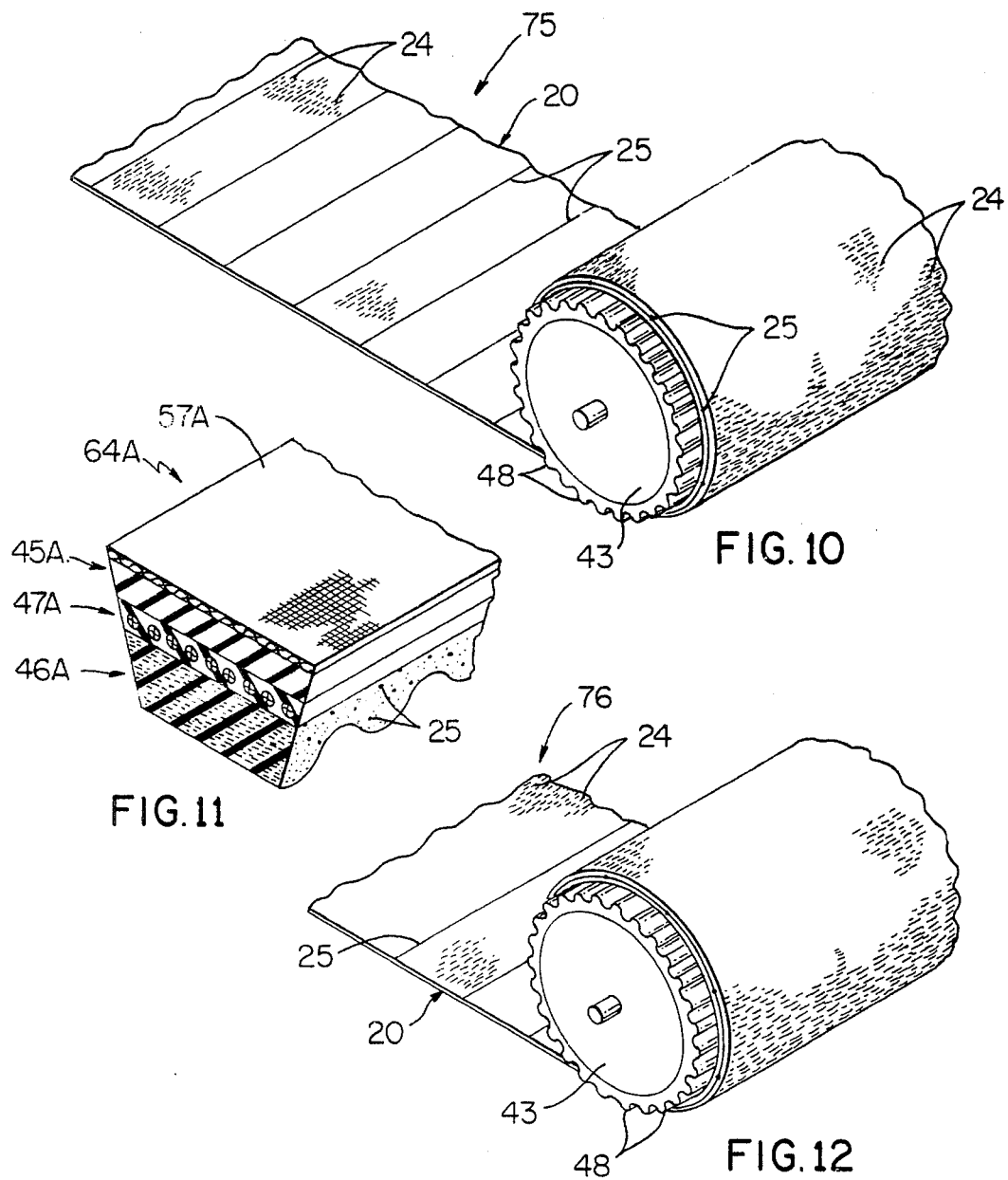

POLYMERIC STRIP FOR A POWER TRANSMISSION BELT, BELT MADE USING SUCH STRIP

This is a division of application Ser. No. 263,963 filed May 15, 1981, now U.S. Pat. No. 4,434,019, issued Feb. 13, 1984.

BACKGROUND OF THE INVENTION

1. Field of the Invention

This invention relates to an uncured fiber-loaded polymeric strip adapted for use in a power transmission belt construction, belt construction made using such strip, and method of making such strip and belt construction.

2. Prior Art Statement

It is known in the art to provide a strip of material adapted for use in making a power transmission belt construction wherein the strip comprises an uncured polymeric matrix material having opposed surfaces and a plurality of elongate reinforcing fibers disposed substantially uniformly throughout the matrix material in a random manner and in substantially parallel relation and as disclosed in U.S. Pat. No., 3,464,875.

However, it has been found that with the desired better dispersion of the reinforcing fibers throughout the matrix material of the strip, i.e., the fibers are substantially isolated from each other so as to preclude the possibility of such fibers cooperating to define flow paths therealong, there is a tendency upon attempting to adhere such strip to an adjoining layer means of a belt construction during curing for fluid-containing voids; or the like, to be formed or appear at the interface of the strip and layer means thereby creating a problem of poor bonding at such interface and hence poor lamination of such strip to the layer means. This forming of voids is aggravated where the reinforcing fibers give off fluids during the curing action.

It is also known in the art of making pneumatic tires of polymeric material to provide so-called bleeder yarns between adjoining polymeric layers which are free of reinforcing fibers.

It is an object of this invention to provide an improved uncured strip of fiber-loaded polymeric material adapted for use in a power transmission belt construction.

Another object of this invention is to provide an improved endless power transmission belt construction made utilizing a strip of the character mentioned.

Another object of this invention is to provide an improved method of making a strip of the character mentioned.

Another object of this invention is to provide an improved method of making a power transmission belt construction utilizing such a strip.

Other aspects, embodiments, objects, and advantages of this invention will become apparent from the following specification, claims, and drawings.

SUMMARY

In accordance with the present invention there is provided an improved uncured fiber-loaded polymeric strip for use in a power transmission belt construction which overcomes the above-mentioned problem. The improved strip is comprised of an uncured polymeric matrix material having opposed surfaces and a plurality of elongate reinforcing fibers disposed substantially uniformly throughout the matrix material in a random manner and in parallel relation.

In accordance with one embodiment of this invention parallel spaced apart bleeder yarns are adhered against at least one of the opposed surfaces and the strip is adapted to be laminated against associated layer means comprising a belt construction on at least one common interface with the bleeder yarns along the interface, and the bleeder yarns are adapted to serve as fluid passages for any fluid present at the interface during curing of the strip and its associated layer means.

Also provided in accordance with this invention is an improved method of making a strip of the character mentioned.

This invention also provides an improved endless power transmission belt comprising a tension section, a compression section, and a load-carrying section with at least one of the sections comprising at least one layer of polymeric matrix material having opposed surfaces and a plurality of elongate reinforcing fibers disposed substantially uniformly throughout the matrix material in a random manner and in parallel relation. Parallel spaced apart bleeder yarns are disposed between at least one of the surfaces and adjoining layer means of the belt construction on at least one common interface with the interface being free of fluid-filled voids due to the bleeder yarns having served as fluid passages for any fluid present at the interface during curing of the belt construction.

Also provided in accordance with this invention is an improved method of making a plurality of endless power transmission belts substantially identical to the above-described belt.

BRIEF DESCRIPTION OF THE DRAWINGS

The accompanying drawings show present preferred embodiments of this invention, on which FIG. 1 is an isometric view with parts in elevation, parts in cross section, and parts broken away illustrating an exemplary strip of material of this invention which has bleeder yarns adhered against opposed surfaces thereof and which is adapted for use in making a power transmission belt construction, and also illustrating method steps employed in making such strip;

FIG. 2 is an isometric view with parts broken away illustrating the strip of FIG. 1 formed as a layer of extended length and showing such layer being wrapped around a toothed belt building drum to define a portion of a belt sleeve;

FIG. 3 is a fragmentary view with parts in cross section and parts in elevation illustrating a small portion of all component layers of an entire belt sleeve wrapped on the building drum of FIG. 2 in preparation for curing such sleeve;

FIG. 4 is a schematic view illustrating the method steps of curing and cooling the belt sleeve of FIG. 3;

FIG. 10 is a view similar to FIG. 2 illustrating the strip of FIG. 9 formed as layer of extended length and showing such layer being wrapped around a toothed belt building drum to define a portion of another embodiment of a belt sleeve;

FIG. 11 is a view similar to FIG. 6 illustrating another embodiment of an endless power transmission belt construction of this invention;

FIG. 12 is a view similar to FIG. 10 illustrating a fiber-loaded uncured layer means being wound to define a portion of a belt sleeve and wherein bleeder yarns are disposed in position on one surface of the layer means during winding thereof;

FIG. 13 is a fragmentary isometric view of one exemplary embodiment of a bleeder yarn comprised of a plurality of fluid pervious twisted fibers; and FIG. 14 is a view similar to FIG. 13 of another exemplary embodiment of a bleeder yarn comprised of a plurality of twisted monofilaments made of fluid impervious material.

DETAILED DESCRIPTION

Figure 5:
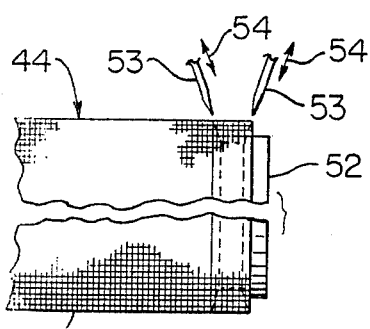
FIG. 5 is a fragmentary view illustrating the cutting of the belt sleeve after curing and cooling to define a plurality of endless power transmission belt constructions of this invention.

Reference is now made to FIG. 1 of the drawings which illustrates one exemplary embodiment of an uncured layer or strip of material which is designated generally by the reference numeral 20 and which is adapted for use in a power transmission belt construction and as will be described in detail subsequently. The strip 20 may be wrapped or wound to define one or more turns thereof and such turns may then be laminated in a high strength manner free of fluid-filled voids at the interface of adjoining turns. Similarly, the strip 20 may be laminated to other layer means or layers, (e.g. fabric layers, unreinforced polymeric layers, gum cushion layers, etc.) also free of fluid-filled voids at the interface of such strip with such layer means or layers.

The strip 20 is comprised of a partially or preferably substantially completely uncured (and hence curable) polymeric matrix material which is designated generally by the reference numeral 21 and which has opposed surfaces each designated by the same reference numeral 22. The strip has a plurality of elongate reinforcing fibers 24 disposed substantially uniformly throughout the matrix material in a random manner and in parallel relation; and, only a representative few of such fibers are designated by the reference numeral 24. The strip 20 is also comprised of a plurality of parallel spaced apart bleeder yarns 25 adhered against at least one of the surfaces 22 and in this example of the invention the bleeder yarns 25 are adhered against both surfaces 22. The strip 20 is adapted to be laminated against associated layer means comprising a belt construction, and as will be subsequently described, on at least one common interface with the bleeder yarns along the interface. The bleeder yarns 25 are adapted to serve as fluid passages for any fluid at the interface during curing of the strip 20 and layer means associated therewith.

The polymeric matrix material 21 may be any suitable matrix material employed in the art of making power transmission belts; and, in this example of the invention such polymeric matrix material is a flowable rubber material. The fibers 24 may be made of any suitable material known in the art and employed for strengthening or imparting stiffness to an associated construction and such fibers may have a diameter ranging between 0.001 inch and 0.050 inch and a length ranging between 0.001 inch and several inches.

Each bleeder yarn 25 is made of at least one fluid pervious member; however, in the embodiment of FIG. 13 of the drawings each bleeder yarn 25 is made of a plurality of fluid pervious twisted fibers 26. The fluid pervious twisted fibers 26 may be made of any suitable natural or synthetic material and twisted cotton fibers have been used successfully to make yarn 25.

The size of the bleeder yarns 25 used in a particular belt construction will vary depending upon the detailed construction thereof. However, each bleeder yarn may have an outside diameter generally of the order of thousandths and this term is intended to cover the range between 2 through 20 thousandths. Generally the bleeder yarns of a given strip 20 and belt construction will be of the same size and it is to be understood that such yarns are used solely to provide a bleeding or venting function inasmuch as they are not usually constructed to provide a strengthening function.

The bleeder yarns 25 need not necessarily be made of fibers or members consisting of fluid pervious material. Indeed each yarn 25 may be made of fluid impervious material whereby FIG. 14 illustrates an exemplary yarn 25 made of a plurality of twisted fluid impervious monofilaments 27. The twisted monofilaments 27 have spaces 30 therebetween which cooperate to define fluid passage means or venting means along each yarn 25.

As described earlier, the strip 20 has parallel bleeder yarns 25 adhered against both of its opposed surfaces 22 and such yarns are disposed substantially transverse the elongated fibers 24. This reference to disposal of the yarns transverse the fibers is intended to define that the yarns 25 are disposed transverse the longitudinal axes of the parallel fibers 24. In the example of the strip shown in FIG. 1, the parallel yarns 25 on each surface 22 are disposed at an angle 31 of approximately 45° to the reinforcing fibers 24. This disposal of the bleeder yarns 25 at 45° enables the utilization of the strip 20 or an associated layer defined from such strip in applications where it is necessary to join overlapped end portions of such strip or layer and still provide bleeder passages or venting in the area of the overlapped portions and as will be described in more detail subsequently.

The strip 20 may be made employing the basic method 33 illustrated in FIG. 1 and such method comprises the steps of providing a mass of uncured yet readily formable polymeric matrix material 21 and mixing a plurality of the elongate reinforcing fibers 24 throughout the matrix material using any suitable mixing apparatus (not shown) known in the art to define a fiber-loaded mass as illustrated at 35 in FIG. 1. The mass at 35 is then formed, using any suitable forming means known in the art, to define the strip 20 which has opposed surfaces 22.

The process of making the strip 20 comprises aligning the fibers 24 randomly yet substantially uniformly throughout the matrix material 21 with the elongate axes in parallel relation and as shown at 36. The forming and aligning steps are achieved in a simultaneous manner by calendering the mass at 35 between calendering rolls 37, which may be of any suitable type known in the art.

The method 33 also includes the step of adhering a plurality of bleeder yarns 25 against at least one of the opposed surfaces 22 and in this example the method comprises adhering bleeder yarns 25 against both of the surfaces 22 and this is achieved utilizing the apparatus 40. The apparatus 40 may be of any type capable of adhering bleeder yarns 25 against the opposed surfaces 22; and, it will be appreciated that such apparatus will utilize spools for the bleeder yarns and associated mechanisms for disposing such bleeder yarns with the desired spacing therebetween and in parallel relation on each surface.

In this example of the invention the strip 20 has its elongate fibers 24 extending parallel to the flow or strip forming direction; and, such a strip may be made of basically unlimited length. There are many applications where the strip 20 may be wound about an axis of a belt building drum where the fibers 24 are perpendicular to such axis, and in these applications the strip 20 may be used essentially as defined in FIG. 1. However, in applications, as the present one, where the strip 20 is wound with its fibers 24 parallel to the longitudinal axis of a belt building drum 43, as shown in FIG. 2, it may be necessary to cut rectangular equal width portions of the strip perpendicular the flow direction 42 and adhere these cut portions in end-to-end relation. This cutting and adhering is well known in the art and thus will not be described herein. The resulting strip will be referred to interchangeably in this specification as a strip or layer and will also be designated by the reference numeral 20 throughout the drawings. It will be appreciated that depending on the width 41 and the size of a particular endless belt to be made using the strip 20 a single rectangular portion may be cut from the strip of FIG. 1, rotated 90 degrees and simply would on its drum 43 to define one or more layers of a belt sleeve.

The strip or layer 20 may be used in making a plurality of endless power transmission belt constructions and as will now be described in connection with FIGS. 2, 3, 4, and 5 of the drawings. In particular, the method 40 comprises the steps of forming an uncured belt sleeve which is designated generally by the reference numeral 44 in FIG. 3 of the drawings. The belt sleeve 44 has a tension section defining portion 45, a compression section defining portion 46, and a load-carrying section defining portion 47. The forming of the belt sleeve 44 comprises wrapping, so as to comprise at least one of the above-described portions 45 through 47, a layer 20. The forming of the belt sleeve is achieved around the previously mentioned conventional belt building drum 43 (FIGS. 2 and 3) which has teeth 48 defining its outside surface.

The belt sleeve is then cured in a curing apparatus 50 and cooled in a cooling apparatus 51 as shown schematically in FIG. 4. The curing apparatus 50 and cooling apparatus 51 may be of any suitable type known in the art.

The cured and cooled belt sleeve 44 is then removed from its building drum 43 and disposed on a cutting mandrel 52, as illustrated in FIG. 5. The belt sleeve 44 is cut using mechanical cutting devices or knives 53 and each knife 53 is moved into and out of cutting engagement employing an associated actuating mechanism 54 which is designated schematically by a double arrow.

Except for the utilization of the strip or layer 20 to define the belt sleeve 44 the build up thereof on building drum 43 is well known and will only be described briefly. It is desired, in this example, to make the belt sleeve 44 (and belts to be made therefrom) with a fabric inside layer 56 as well as a fabric outside layer 57. The inside layer 56 is preferably disposed in snug relation against the undulating outside surface of the toothed building drum 43 utilizing techniques which are known in the art.

Once the fabric layer 56 is in position on the drum 43 the strip or layer 20 is wrapped in position, as shown in FIG. 3, and in this example four turns of the layer 20 are wrapped in position and cooperate with the fabric layer to define portion 46 of the belt sleeve 44.

The lower cushion, gum cushion 60, of the load-carrying section defining portion 47 is then wound in position, followed by helically winding the load-carrying cord 61, and then followed by winding the top cushion 82 outwardly of the load-carrying cord 61.

Another length of the strip or layer 20 is then wrapped in position outwardly of the top cushion 62 to define two turns thereof followed by the outside fabric layer 57. The outside fabric layer 57 and two adjoining turns of layer 20 define the tension section defining portion 45 of the sleeve 44.

The strip or layer 20 has bleeder yarns 25 on both of its surfaces 22. Thus, it is apparent that bleeder yarns 25 are disposed throughout the uncured belt sleeve 44 and when viewed in cross section or toward the end thereof such yarns are illustrated as enlarged dots with only a few of such dots being designated by the reference numeral 25.

Accordingly, it will be seen that bleeder yarns 25 are disposed at the interface of the inner fabric layer 56 and the inner turn of the strip 20, at the interface of adjoining turns of the strip 20 in the sleeve portion 46, and at the interface of the outermost turn of the strip 20 and the lower cushion 60. It will also be seen that bleeder yarns 25 are disposed at the interface of the top cushion 62 and the inner turn of the strip 20 in sleeve portion 45, at the interface of adjoining turns of the strip 20 in sleeve portion 45, and at the interface of the outer turn of the strip 20 and the outer fabric layer 57.

In accordance with the teachings of this invention the bleeder yarns 25 serve as fluid passages for conveying any fluid present at each interface away therefrom during the curing of the sleeve 44 in the curing device 50. This results in each interface being free of fluid-filled voids and thereby results in each corresponding interface of an associated power transmission belt construction, made from the cured sleeve 44, also being free of fluid-filled voids.

Figure 6:
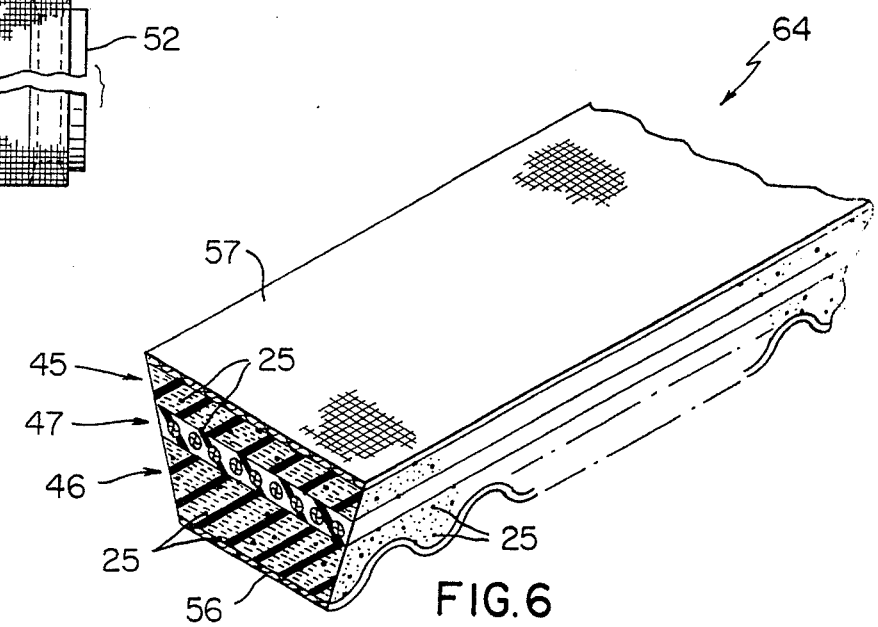
FIG. 6 is a fragmentary isometric view with parts in cross section illustrating a typical belt of this invention.

Once the belt sleeve 44 is cured and cooled (FIG. 4), as described earlier, it is cut (FIG. 5) to define a plurality of belts and each of such belts is designated by the reference numeral 64. A typical belt 64 is shown in FIG. 6.

The belt 64 has a tension section, a compression section, and load-carrying section which, for simplicity, are designated by the same respective reference numerals 45, 46, and 47 as corresponding belt defining portions of the uncured belt sleeve 44. Further, it will be seen that at least one of the sections is comprised of at least one intergral layer or turn of the strip 20. Inasmuch as the belt 64 is made from the belt sleeve 44 the tension section 45 thereof is comprised of two turns of the strip 20 and the compression section 46 is comprised of four turns of strip 20.

As described in connection with the method of making the belt sleeve 44, the completed belt 64 has a plurality of parallel spaced apart bleeder yarns 25 disposed at the previously described interfaces. However, it will be appreciated that such interfaces are not present and hence not visible, as such, in the completed belt 64 due to the polymeric material having moved and adhered in position during curing so that the belt 64 is a single void free structure. Nevertheless, the bleeder yarns 25 at each interface have served as fluid passages for any fluid present at the interface during curing of the belt construction and more specifically, in this example, during curing of the belt sleeve from which the belt 64 has been cut.

In the above description a length of the strip 20 has been described as being wrapped or wound in a plurality of two adjoining turns in belt sleeve portion 45 and another length of the strip 20 has been wrapped in a plurality of four adjoining turns in belt sleeve portion 46. However, the strip 20 lends itself to making portions of a belt sleeve, and hence a belt 64, in which a single turn of the strip 20 may be wrapped into position with opposite end portions overlapped to define a pair of a particular belt sleeve portion and without concern for venting of the overlapped end portions which is usually a problem with this latter type of construction.

Figure 7:
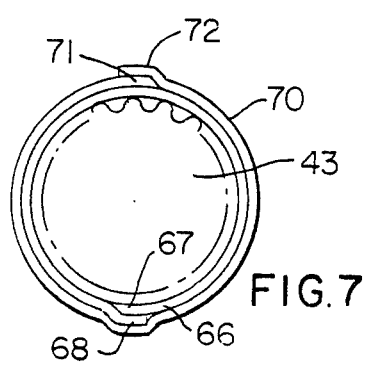
FIG. 7 is an end view illustrating the strip of this invention formed as a pair of layers and each layer is wrapped in position to define a tubular layer of a belt sleeve and with the end portions of each layer being disposed in overlapped relation.

For example, in the illustration of FIG. 7 a length of strip 20 is used to define an inner layer 66 of a compression section defining portion 46 of a belt sleeve 44. The layer 66 has an inner end portion 67 disposed against the toothed building drum 43 whereupon the layer 66 is then wrapped around the complete circumference of the building drum and has an end portion 68 overlapped against the inner portion 67. Another length of strip 20 may be used to define the next layer 70 which ajoins the layer 66. The layer 70 has an inner end portion 71 disposed against layer 66 at a location which is substantially diametrically opposite portions 67-68 and layer 70 has a terminal end portion 72 overlapped against end portion 71. Any desired number of lengths of strip 20 may be used to define a corresponding number of layers and preferably the overlapped end portions are circumferentially staggered. However, the unique character of the strip 20 results in venting being provided at the overlapped end portions of each layer.

Figure 8:
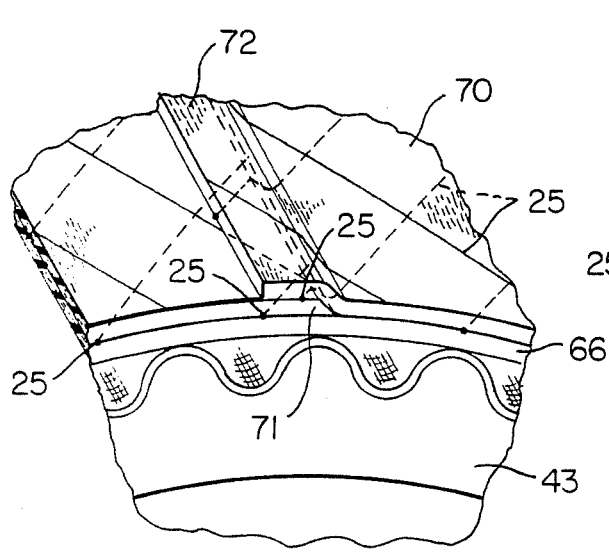
FIG. 8 is a fragmentary isometric view illustrating the manner in which the bleeder yarns comprising the strip of this invention are disposed in position in the area of overlapped portions of the outer layer of FIG. 7 to provide venting or fluid passages in such area.

FIG. 8 of the drawings is typical of the venting action provided and is shown for the end portions 71 and 72 of layer 70; and, it is seen that bleeder yarns 25 extend from the area of the overlapped portions 71-72 to the ends of the layer 70 overlying the ends of the drum 43. The near end of the drum 43 is shown in FIG. 8 together with the near end of the layer 70 and exposed ends of bleeder yarns 25.

In the illustrations of FIGS. 7 and 8, the overlapped end portions of layers 66 and 70 appear to provide a substantial increase in radial thickness to each layer at the overlapped locations. However, this increased thickness is not only exaggerated for clarity but also essentially disappears once the belt sleeve is cured due to shifting of the polymeric material during curing. Accordingly, the resulting belt sleeve is basically free of bulges, or the like, yet bleeder yarns have performed their intended function. It will also be appreciated that with the bleeder yarns 25 disposed substantially at 45° the desired bleeding or venting in the area of joints is also achieved when joining ends of strip 20 using butt joints, bevel-type joints, and the like.

The strip 20 need not necessarily be made with bleeder yarns on both surfaces 22 thereof and at an angle of 45° with the fibers 24. For example, a modification of the strip 20 is provided in FIG. 9 in which a plurality of bleeder yarns 25 are adhered against only one surface and parallel to such fibers 24.

Figure 9:
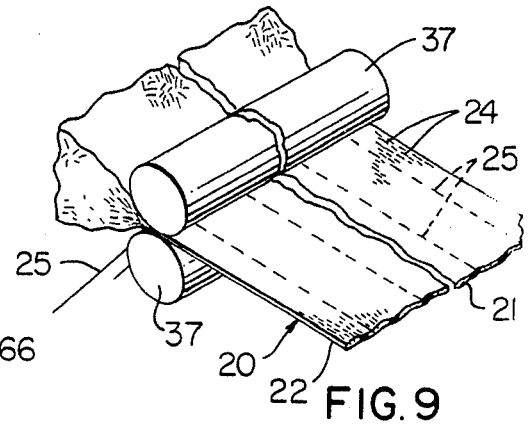
FIG. 9 is a view similar to FIG. 1 illustrating another embodiment of the strip of this invention and method steps employed in making same.

The strip 20 of FIG. 9 is made by forming a flowable mass of polymeric rubber material 21 having reinforcing fibers 24 dispersed therethrough using calendering rolls 37. Simultaneously with this forming action parallel spaced apart yarns 25 are adhered aginst the bottom surface 22, as viewed in FIG. 9, of the strip 20. This adhering action is achieved by passing each yarn between the top of the lower calendering roll 37 and the bottom surface 22 of the strip 20. The yarns 25 may be fed between the lower calendering roll 37 and the bottom surface 22 while simultaneously unwinding same from associated rotatable spools (not shown) and as is known in the art.

The strip 20 of FIG. 9 may be disposed or processed as previously described so that the fibers 24 and yarns 25 thereof are disposed parallel to the longitudinal axis of the belt building drum 43 and as illustrated at 75 in FIG. 10.

It will also be appreciated that instead of adhering the yarns 25 against a surface of a strip of uncured polymeric matrix material during the initial forming of such strip it may be preferred to adhere the bleeder yarns 25 and complete the strip immediately prior to using same and as illustrated in FIG. 12. In particular, a strip or layer of uncured polymeric matrix material may be provided which has the fibers 24 embedded therein with the desired orientation and as illustrated at 76. Immediately prior to wrapping or winding the strip on a belt building drum 43 a plurality of parallel spaced apart bleeder yarns 25 are suitably disposed against the strip to define the completed strip 20. The bleeder yarns 25 in this instance may be disposed in position utilizing any suitable technique known in the art and such bleeder yarns may be disposed in position manually, if desired.

The strip 20 shown in either FIG. 10 or FIG. 12 may be suitably wrapped or wound in position against an associated building drum 43 as illustrated in each of these FIGS. and may be used to define a plurality of inner turns of a compression section defining portion of a belt sleeve. Further, the number of turns used will vary depending on the desired construction of the endless power transmission belt to be defined from such sleeve. It will also be noted that in the illustrations of FIGS. 10 and 12 each strip 20 is wrapped in position against the teeth 48 of the belt building drum 43 without wrapping of fabric material snugly against the teeth whereby the resulting belt sleeve and endless power transmission belts defined therefrom will be free of an inside fabric layer. The remainder of the belt sleeve is defined in a similar manner as the belt sleeve illustrated in FIG. 3 and the belt sleeve thus defined is suitably cured, cooled, and cut in a similar manner as described previously to define a plurality of endless power transmission belts.

A typical belt made from a belt sleeve which uses either the strip of FIG. 10 or the strip of FIG. 12 is illustrated in FIG. 11 of the drawings and such belt is similar to the belt 64 previously described whereby such belt will be also designated by the reference numeral 64 followed by the reference letter A. The belt 64A also has sections which correspond to sections of the belt 64 and these sections of belt 64A will be designated by the same reference numerals as previously also followed by the letter designation A and not described in detail.

Accordingly, the belt 64A comprises a tension section 45A, a compression section 46A, and a load-carrying section 47A. The belt 64A utilizes a plurality of turns of a strip of polymeric material which has not been reinforced to define tension section 45A and such tension section has an outside fabric layer 57A. The belt 64A also has a load-carrying section 47A which is substantially identical to the load-carrying section 47 previously described.

There are three main differences between the belt 64A and the belt 64. The first difference is that the belt 64A has its compression section 46A made free of an inside fabric layer. The second difference is that the bleeder yarns 25 between the interfaces of adjoining turns of the strip 20A used to define the compression section are disposed parallel to the reinforcing fibers and both such fibers and bleeder yarns are disposed perpendicular to the longitudinal axis of the belt. The third difference is that the tension section 45A is made of rubber free of or without reinforcing fibers 24, or the like.

In this disclosure of the invention each belt 64 and 64A is shown as having a toothed compression section; however, it is to be understood that the teachings of this invention may be utilized in defining all types of belts including plain V-belts which are free of teeth in their compression section, timing or synchronous belts, belts with teeth in both the tension and compression sections, ribbed belts of all types, flat belts, banded belts, or any other type of endless power transmission belt known in the art.

While present exemplary embodiments of this invention, and methods of practicing the same, have been illustrated and described, it will be recognized that this invention may be otherwise variously embodied and practiced within the scope of the following claims.

What is claimed is:

1. In a substantially rectangular strip of material having opposed ends, said strip of material being adapted for use in a power transmission belt construction, said strip comprising an uncured polymeric matrix material having opposed surfaces, each surface having a pair of opposed side edges and a pair of opposed end edges, and a plurality of elongate reinforcing fibers disposed substantially uniformly throughout said matrix material in a random manner and in parallel relation, the improvement comprising a plurality of parallel spaced apart bleeder yarns adhered against at least one of said surfaces so that each edge of said one surface has a plurality of said bleeder yarns extending thereto, said strip being adapted to be laminated against associated layer means comprising said belt construction on at least one common interface with said bleeder yarns along said interface, said opposed ends being disposed in overlapping relation on a common interface therebetween with certain of said bleeder yarns along said interface of said ends, and said bleeder yarns being adapted to serve as fluid passages for any fluid present at said interfaces during curing of said strip and its associated layer means.

2. A strip as set forth in claim 1 in which said fibers have a diameter ranging between 0.001 inch and 0.050 inch and a length ranging between 0.001 inch and several inches.

3. A strip as set forth in claim 1 in which each of said bleeder yarns is made of at least one fluid pervious member.

4. A strip as set forth in claim 1 in which each of said bleeder yarns is made of a plurality of fluid pervious members.

5. A strip as set forth in claim 4 in which said plurality of fluid pervious members consists of a plurality of twisted fibers.

6. A strip as set forth in claim 5 in which said twisted fibers are cotton fibers and each of said yarns has an outside diameter generally of the order of thousandths.

7. A strip as set forth in claim 1 in which each of said yarns is made of a plurality of twisted monofilaments of fluid impervious material, said twisted monofilaments defining fluid passage means therebetween.

8. A strip as set forth in claim 1 in which said yarns are disposed parallel to said reinforcing fibers.

9. A strip as set forth in claim 1 in which said yarns are disposed substantially transverse said reinforcing fibers.

10. A strip as set forth in claim 9 in which said yarns are disposed at an angle of approximately 45° to said reinforcing fibers.

11. A strip as set forth in claim 1 and further comprising a second plurality of parallel spaced apart bleeder yarns adhered against the other of said surfaces, said strip being adapted to be laminated against said associated layer means having said first-named plurality of bleeder yarns on said one common interface and having said second plurality of bleeder yarns on a second common interface of said layer means, said second plurality of bleeder yarns serving as fluid passages for any fluid present at said second common interface during curing of said strip and layer means.

12. A strip as set forth in claim 6 in which said matrix material is rubber.

13. In an endless power transmission belt construction comprising, a tension section, a compression section, and a load-carrying section, at least one of said sections comprising at least one integral substantially rectangular layer of polymeric matrix material having opposed surfaces, opposed ends, and a plurality of elongate reinforcing fibers disposed substantially uniformly throughout said matrix material in a random manner and in parallel relation, the improvement comprising a plurality of parallel spaced apart bleeder yarns disposed between at least one of said surfaces so that each edge of said one surface has a plurality of said bleeder yarns extending thereto, and adjoining layer means of said belt construction on at least one common interface said opposed ends being disposed in overlapping relation on a common interface therebetween with certain of said bleeder yarns along said interface of said ends, said interface being free of fluid-filled voids due to said bleeder yarns having served as fluid passages for any fluid present at said interface during curing of said belt construction.

14. A belt construction as set forth in claim 13 in which said one section comprising said one integral layer of polymeric matrix material is said compression section.

15. A belt construction as set forth in claim 13 in which said one section comprising said one integral layer of polymeric matrix material is said tension section.

16. A belt construction as set forth in claim 13 and further comprising a second integral layer which is substantially identical to said one integral layer, said second layer being disposed in another of said sections, a second plurality of parallel spaced apart bleeder yarns disposed between at least one of the opposed surfaces of said second layer and adjoining layer means of said belt construction on a second common interface therebetween, said second interface also being free of fluid-filled voids due to said second plurality of bleeder yarns having served as fluid passages for any fluid present at said second interface during curing of said belt construction.

* * * * *